(12) United States Patent
Lukas et al.

(10) Patent No.: US 10,935,693 B2
(45) Date of Patent: Mar. 2, 2021

(54) PREDICTION OF ICE CRYSTAL PRESENCE IN A VOLUME OF AIRSPACE

(71) Applicant: Honeywell International Inc., Morristown, NJ (US)

(72) Inventors: Jan Lukas, Brno (CZ); Ondrej Kotaba, Orlova (CZ); David C. Vacanti, Renton, WA (US); Michal Dobes, Olomouc (CZ); Brennan Kilty, Cheyenne, WY (US)

(73) Assignee: Honeywell International Inc., Charlotte, NC (US)

(*) Notice: Subject to any disclaimer, the term of this patent is extended or adjusted under 35 U.S.C. 154(b) by 1016 days.

(21) Appl. No.: 14/673,524

(22) Filed: Mar. 30, 2015

(65) Prior Publication Data

US 2016/0274271 A1 Sep. 22, 2016

Related U.S. Application Data

(60) Provisional application No. 62/135,020, filed on Mar. 18, 2015.

(51) Int. Cl.
*G01W 1/02* (2006.01)
*G01S 13/95* (2006.01)
(Continued)

(52) U.S. Cl.
CPC ............ *G01W 1/02* (2013.01); *G01S 7/04* (2013.01); *G01S 13/953* (2013.01); *G01S 7/062* (2013.01); *G01S 7/22* (2013.01)

(58) Field of Classification Search
CPC .......... G01W 1/02; G01S 7/04; G01S 13/953; G01S 2013/0254; G01S 13/34;
(Continued)

(56) References Cited

U.S. PATENT DOCUMENTS 4,940,987 A 7/1990 Frederick
5,028,929 A 7/1991 Sand et al.
(Continued)

OTHER PUBLICATIONS

Boudala et al., "Ice water content and precipitation rate as a function of equivalent radar reflectivity and temperature based on in situ observations", Dec. 2006, Journal of Geophysical Research, vol. 111, 13 pages.*

(Continued)

*Primary Examiner* — Robert G Bachner
(74) *Attorney, Agent, or Firm* — Shumaker & Sieffert, P.A.

(57) ABSTRACT

In some examples, a processor is configured to predict the presence of ice crystals (e.g., high altitude ice crystals) in a volume of airspace based on radar reflectivity values and one or more other types of information indicative of weather conditions in the volume of airspace, such as one or more of: ambient air temperature and altitude. For example, the processor may predict the ice crystals presence by at least estimating the iced water content level within a volume of airspace of interest based on radar reflectivity values for the volume of airspace (e.g., stored as in a three-dimensional buffer) and other information indicative of weather conditions of the volume of airspace. The processor may estimate the iced water content level using a model that relates the information indicative of weather conditions in and around the volume of interest to iced water content in the atmosphere.

16 Claims, 4 Drawing Sheets

(51) Int. Cl.
*G01S 7/04* (2006.01)
*G01S 7/06* (2006.01)
*G01S 7/22* (2006.01)

(58) Field of Classification Search
CPC ...... G01S 7/35; G01S 13/4463; G01S 13/882;
G01S 13/933; G01S 13/4472; G01S
13/87; G01S 2013/0245; G01S 7/352;
G01S 13/93; G01S 13/935; G01S 7/032;
A61K 2300/00; A61K 31/404; A61K
31/445; A61K 45/06; A61K 9/48; A61K
31/135; A61K 31/203; A61K 31/437;
A61K 31/44; A61K 31/675; A61K
31/704; A61K 31/7048; A61K 31/7068;
A61K 31/137; A61K 31/4439; A61K
31/45; A61K 8/0295; A61K 8/345; A61K
8/39; A61K 8/44; A61K 8/604; H01Q
1/525; H01Q 1/28; H01Q 1/42; H01Q
21/065; H01Q 1/281; H01Q 21/0043;
H01Q 3/06; H01Q 1/287; H01Q 21/005;
H01Q 21/28; H01Q 25/005; H01Q 3/26;
H01Q 1/2291; H01Q 1/3233; H01Q
21/00; H01Q 3/34; H01Q 3/38; H01Q
13/10; H01Q 13/18; H01Q 13/20; H01Q
13/22; H01Q 1/34; H01Q 1/38; H01Q
1/40; H01Q 21/20; H01Q 23/00; H01Q
25/002; H01Q 3/04; H01Q 3/08; H01Q
3/36; G06T 2207/10028; G06T
2207/30252; G06T 17/00; G06T 7/73;
G06T 7/74; G06T 15/10; G06T 19/003;
G06T 2207/10004; G06T 2207/10032;
G06T 2207/20152; G06T 2207/30248;
G06T 7/246; G06T 7/33; G06T 7/35;
G06T 17/20; G06T 17/30; G06T 2200/04;
G06T 2207/10016; G06T 2207/10048;
G06T 2207/30181; G06T 2207/30232;
G06T 3/00; G06T 7/10; G06T 7/11;
G06T 7/12; G06T 7/248; G06T 7/251;
G06T 7/254; G06T 7/30; G06T 7/44;
G06T 7/50; G06T 7/579; G06T 7/70
See application file for complete search history.

(56) References Cited

U.S. PATENT DOCUMENTS

| | | | |
|---|---|---|---|
| 5,202,690 A | 4/1993 | Frederick | |
| 5,781,146 A | 7/1998 | Frederick | |
| 5,828,332 A | 10/1998 | Frederick | |
| 5,850,619 A * | 12/1998 | Rasmussen | G01W 1/14 342/26 D |
| 5,920,276 A | 7/1999 | Frederick | |
| 6,347,767 B1 | 2/2002 | Holmen | |
| 6,377,202 B1 | 4/2002 | Kropfli et al. | |
| 6,597,305 B2 | 7/2003 | Szeto et al. | |
| 6,615,140 B2 | 9/2003 | White et al. | |
| 6,667,710 B2 | 12/2003 | Cornell et al. | |
| 6,690,317 B2 | 2/2004 | Szeto et al. | |
| 6,707,415 B1 | 3/2004 | Christianson | |
| 6,720,906 B2 | 4/2004 | Szeto et al. | |
| 6,741,203 B1 | 5/2004 | Woodell | |
| 6,839,018 B2 | 1/2005 | Szeto et al. | |
| 7,417,577 B2 | 8/2008 | Testud et al. | |
| 7,492,304 B1 | 2/2009 | Woodell et al. | |
| 7,541,971 B1 | 6/2009 | Woodell et al. | |
| 8,068,050 B2 | 11/2011 | Christianson | |
| 8,111,186 B2 | 2/2012 | Bunch et al. | |
| 8,228,227 B2 | 7/2012 | Bunch et al. | |
| 8,289,202 B1 | 10/2012 | Christianson | |
| 8,659,468 B2 | 2/2014 | Pujol et al. | |
| 8,724,099 B2 | 5/2014 | Asahara et al. | |
| 9,188,700 B2 * | 11/2015 | Bunch | G01W 1/00 |
| 9,244,166 B1 * | 1/2016 | Finley | G01S 13/953 |
| 9,535,158 B1 * | 1/2017 | Breiholz | G01S 13/953 |
| 2010/0245167 A1 * | 9/2010 | Bunch | G01S 7/003 342/26 B |
| 2011/0148694 A1 * | 6/2011 | Bunch | G01S 13/953 342/26 B |
| 2011/0187588 A1 * | 8/2011 | Khatwa | G01C 23/00 342/26 B |
| 2012/0133551 A1 * | 5/2012 | Pujol | G01S 7/411 342/26 R |
| 2012/0139778 A1 * | 6/2012 | Bunch | G01S 13/953 342/26 B |
| 2013/0008174 A1 | 1/2013 | Gould et al. | |
| 2013/0234884 A1 * | 9/2013 | Bunch | G01W 1/00 342/26 B |
| 2014/0309977 A1 * | 10/2014 | Kamarianakis | G08G 1/0116 703/6 |
| 2015/0073710 A1 * | 3/2015 | Deierling | G01W 1/16 702/4 |
| 2015/0304813 A1 * | 10/2015 | Esposito | H04B 7/155 455/456.2 |
| 2016/0011334 A1 * | 1/2016 | Khatwa | G01S 13/953 702/3 |
| 2016/0011839 A1 * | 1/2016 | Khatwa | G06F 3/147 345/7 |
| 2016/0033641 A1 | 2/2016 | Bunch et al. | |
| 2017/0104276 A1 | 4/2017 | Vacanti et al. | |
| 2017/0160389 A1 | 6/2017 | Vacanti | |

OTHER PUBLICATIONS

Mason et al., "The Ice Particle Threat to Engines in Flight", Jan. 2006, 44$^{th}$ AIAA Aerospace Sciences Meeting and Exhibit, AIAA 2006-206, 21 pages.*

Heymsfield et al., "Improved Radar Ice Water Content Retrieval Algorithms Using Coincident Microphysical and Radar Measurements", Sep. 2005, American Meterological Society, vol. 44, pp. 1391-1412.*

Heymsfield et al., "Testing IWC Retrieval Methods Using Radar and Ancillary Measurements with In Situ Data", Jan. 2008, American Metrological Society, vol. 47, pp. 135-163.*

Pokharel et al., "Evaluation of Collated Measurements of Radar Reflectivity and Particle Sizes in Ice Clouds", Journal of Applied Metrology and Climatology, Apr. 2011, vol. 50, pp. 2104-2119.*

Hogan et al., "The Retrieval of Ice Water Content from Radar Reflectivity Factor and Temperature and Its Use in Evaluating a Mesolscale Model", American Metrological Society, Journal of Applied Metrology and Climatology, vol. 45, Jun. 2005, pp. 301-317.*

"NASA Goes Down Under to Tap High-Altitude Ice," NASA News, retrieved Jul. 8, 2014 from http://www.nasa.gov/aero/haic_camaign. html#.U7wsHPIdUjQ, 3 pp.

Noel, V. et al., "Classification of ice crystal shapes in midlatitude ice clouds from three years of lidar observations over the SIRTA observatory," Journal of Atmospheric Sciences 63, hal-00115274, version 1-20, Nov. 2006, pp. 2978-2991.

Sayres et al., "Validation and determination of ice water content-radar reflectivity relationships during CRYSTAL-FACE: Flight requirements for future comparisons," Journal of Geophysical Research, vol. 113, Mar. 6, 2008, 10 pp.

Extended Search Report from counterpart European Application No. 16159054.2, dated Jul. 19, 2016, 6 pp.

* cited by examiner

PREDICTION OF ICE CRYSTAL PRESENCE IN A VOLUME OF AIRSPACE

This application claims the benefit of U.S. Provisional Application No. 62/135,020, filed Mar. 18, 2015, and entitled "PREDICTION OF ICE CRYSTAL PRESENCE IN A VOLUME OF AIRSPACE," the entire content of which is incorporated herein by reference.

TECHNICAL FIELD

The disclosure relates to aircraft weather radar systems and methods.

BACKGROUND

A weather system of some aircraft includes a display that provides a visual indication of weather conditions proximate to the aircraft. The weather system can determine the weather based on information from, for example, a weather radar system onboard the aircraft, other sensors onboard, e.g. lighting detector or an ambient air temperature sensor, or from information obtained from outside of the aircraft, e.g. data from ground-based weather radar obtained through a datalink.

SUMMARY

The disclosure describes example devices, systems, and techniques for predicting the presence of ice crystals (e.g., high altitude ice crystals) in a volume of airspace of interest (also referred to herein as a "volume of interest") based on radar reflectivity values in the volume of airspace surrounding the volume of interest (also referred to herein as a "surrounding airspace" or "surrounding volume"), and, in some examples, in the volume of interest as well. In some examples, the presence of ice crystals is predicted based on radar reflectivity values and one or more other types of information indicative of weather conditions in the surrounding volume and, in some cases, the volume of interest, the information being, for example, one or more of: atmospheric temperature, altitude of the volume of airspace, and a freezing altitude. The radar reflectivity values may be those values associated with a volume of airspace around a point (or volume) for which the ice crystal inference is being performed. In this way, the radar reflectivity values may be referred to as three-dimensional array of radar reflectivity information, which may be stored in a three-dimensional (or "volumetric") memory buffer.

In some examples described herein, a processor is configured to infer the presence of ice crystals by at least estimating the iced water content level within a volume of interest based on the spatial distribution of radar reflectivity values in the surrounding volume and other information indicative of weather conditions of the surrounding volume. The processor may estimate the iced water content level (e.g., measured as a density of ice crystals in the volume of airspace) using a model that relates the information indicative of weather conditions in and around the volume of interest to iced water content in the atmosphere.

In some examples, the processor may estimate the iced water content level in a volume of interest using two or more models, each of the models being more accurate for different iced water content levels. Thus, in these examples, rather than determining a single iced water content level using one model that covers all iced water content levels, the processor determines multiple iced water content level estimations.

In some examples, based on one or more estimated iced water content levels for the volume of interest, the processor may generate a notification to a user, e.g., a pilot of an aircraft in or near the volume of interest. The notification may indicate ice crystals of sufficient density to pose a potential hazard have been predicted. In addition to, or instead of, the notification, the processor may generate a graphical user interface that indicates the one or more estimated iced water content levels, alone or in conjunction with other information, such as radar reflectivity values, a graphical indication of the flight path of an aircraft, one or more aircraft icons, and the like.

In one aspect, the disclosure is directed to a method comprising receiving, by a processor, information indicative of weather in a volume of airspace surrounding a volume of interest (and, in some examples, in the volume of interest itself), wherein the information comprises radar reflectivity values; and determining, by the processor and based at least in part on a model and the received information, a predicted iced water content level for the volume of interest.

In another aspect, the disclosure is directed to a system comprising a memory configured to store a model and information indicative of weather in a volume of airspace surrounding a volume of interest (and, in some examples, in the volume of interest itself), wherein the information comprises radar reflectivity values; and a processor configured to determine, based at least in part on the model and the information, a predicted iced water content for the volume of interest.

In another aspect, the disclosure is directed to a system comprising means for receiving information indicative of weather in a volume of airspace surrounding a volume of interest (and, in some examples, in the volume of interest itself), wherein the information comprises radar reflectivity values; and means for determining, based at least in part on a model and the received information, a predicted iced water content level for the volume of interest.

In another example, the disclosure is directed to a computer-readable storage medium comprising instructions that, when executed by a processor, cause the processor to receive information indicative of weather in a volume of airspace surrounding a volume of interest (and, in some examples, in the volume of interest itself), wherein the information comprises radar reflectivity values; and determine, based at least in part on a model and the received information, a predicted iced water content level for the volume of interest.

In another aspect, the disclosure is directed to an article of manufacture comprising a computer-readable storage medium. The computer-readable storage medium comprises computer-readable instructions that are executed by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a processor to perform the techniques described herein. The computer-readable medium is non-transitory computer-readable storage medium in some examples.

The details of one or more examples of the disclosure are set forth in the accompanying drawings and the description

DETAILED DESCRIPTION

It may be desirable to minimize or even avoid flight of an aircraft in an airspace with ice crystals, e.g., to help prevent adverse effects on the aircraft engine, or on the functioning of aircraft sensors, such aircraft heated probes (e.g. Pitot probes).

High altitude ice crystals may be observed at and around convective weather, and, in some examples, also more than 30 nautical miles (NM) downwind of the storm. Existing aircraft weather radars are not designed to detect ice crystals, which can include any and all reflectivity values are interpreted as water. Because ice crystals have significantly lower reflectivity than liquid water, existing weather radar systems do not signal hazardous conditions to the pilot, even for high concentrations of ice crystals.

Simple prediction of ice crystal presence by analyzing convective weather (e.g., either by a pilot of an aircraft or automatically by a weather radar system onboard the aircraft) may result in many false positive predictions of ice crystal presence, which may lead to unnecessary deviations from an intended flight path, e.g., as a pilot flies the aircraft to avoid flying above convective weather or downwind of it.

Depending on the mechanism of the ice crystal build-up, ice crystals may be different sizes and shapes, from simple spherical shapes, up to complex snow-flake-like structures. For example, spherical ice crystals, while being relatively heavy, may have a relatively small radar cross-section (i.e., the area visible by radar) when compared to snow-flake-like fractal-shaped ice crystals. In another example, snow-flake-like fractal-shaped crystals may be relatively lightweight, containing little water, when compared to spherical ice crystals, but may have a significantly larger radar cross-section. Therefore, with any type of ice crystal, the concentration of ice crystals may be relatively difficult to infer using only the radar reflectivity values for the airspace in which the ice crystals are present.

In examples described herein, a system is configured to predict the presence of high-altitude ice crystals within a volume of airspace of interest (also referred to herein as a "volume of interest") based on the weather surrounding the volume of interest. The presence of high altitude ice crystals may be predicted based on a predicted iced water content level in the volume of interest (e.g., measured as a density of ice crystals in the volume of airspace). For example, the system may be configured to predict the presence of high-altitude ice crystals based on radar reflectivity values in, under, and around the volume of interest (i.e., radar reflectivity values associated with the surrounding volume), and, in some, but not all, examples, based on one or more other types of information indicative of weather conditions in the volume of interest, such as one or more of: ambient air temperature, position (including altitude), and freezing altitude. These types of weather information may be readily available to systems onboard an aircraft, e.g., due to sensors onboard the aircraft, from information from sources external to the aircraft (e.g., on the ground or other aircraft), or any combination thereof.

Honeywell IntuVue® RDR-4000 3D weather radar, an existing product available on the market, is an example of a weather radar system that may use for its operation, for example but not limited to, aircraft position, aircraft attitude, and ambient air temperature provided by other aircraft systems. As a result of the availability of these types of weather information, the systems and techniques described herein for detecting ice crystals may be implemented on existing aircraft, allowing for relatively easy implementation (e.g., retrofit).

The radar reflectivity values in, under, and around the volume of interest may be stored by an aircraft weather system in a three-dimensional (3D) buffer of a memory. For example, a processor may receive data from one or more weather information sources (e.g., radar return data), and translate the received data for storage in a 3D buffer in memory 34. As an example, a weather radar system may be configured scan the entire 3D space in front of an aircraft, and a processor may store all reflectivity data in an earth-referenced 3D (or "volumetric") memory buffer. The processor may update the buffer with reflectivity data from new scans by the weather radar system.

The temperature may be, for example, the air temperature in the volume of interest or in a volume of airspace surrounding the volume of interest, which may be estimated based on the external air temperature sensed by a temperature sensor onboard the aircraft. For example, the temperature in the volume of interest may be external air temperature sensed by a temperature sensor onboard the aircraft. In some examples, the altitude of the volume of interest may be estimated based on the current altitude of the aircraft. For example, the altitude of the volume of interest may be set based on current altitude of the aircraft, range, and elevation angle, under which the target area has been observed by the aircraft's weather radar system. In other examples, the processor may determine the altitude of the volume of interest based on other information.

The volume of interest, as well as the volume of airspace surrounding the volume of interest, can be any suitable size. In some examples, the volume of interest is the same size as a bin of a 3D memory buffer used to store radar reflectivity values. In some examples, the volume of interest may be determined by either manual or automatic analysis of the convective weather and/or wind speed and direction, presence of stratiform rain below the freezing altitude, etc.

The ice crystal presence predicted using the techniques described herein may be pure or impure ice crystals, and may be mixed with liquid water. Thus, in some examples, the ice crystal detection system described herein may detect mixed-phase (mixed ice and liquid water) conditions using the techniques described herein. The systems and techniques described herein may be used to detect altitude ice crystals at freezing altitudes and, in some examples, at altitudes below freezing level.

The presence of ice crystals may be indicated by the iced water content (IWC) at a particular point in space (e.g., measured as a density of ice crystals in the volume of airspace). Iced water content may be the mass of water in the solid phase contained in a volume of air, e.g., grams per cubic meter (g/m³). In some examples, iced water content may be determined using the following equation:

$$IWC_i = f(Z_i, m_S(d), PSD_S(d)) \quad \text{(Equation 1)}$$

where Z is the observed reflectivity at a specific point, m(d) is the mass-dimension relationship, and PSD(d) is the particle size distribution. The latter two parameters are not observable by radar directly, yet affect the reflectivity of ice crystals.

The mean mass-dimension relationship of an ice crystal—denoted m(d)—can be considered to be the mean mass of the ice crystal of a specific diameter. The specific mass-dimension relationship depends on the conditions during which the ice crystal built-up. Some of the factors influencing the mass-dimension relationship of an ice crystal are: temperature, vertical speed of the crystal, vertical speed of air, the density and size of condensation/crystallization nuclei, atmospheric pressure, humidity, and the like. The size distribution of ice crystals—denoted PSD(d)—is somewhat related, as it also depends on similar factors. Depending on the conditions, the water vapor may condense and then crystallize to either larger number of smaller crystals or smaller number of larger crystals; which also affects the radar reflectivity. An additional factor that may affect the development of ice crystals and, therefore, may be indicative of the presence of ice crystals in a particular volume of air, is the spatio-temporal evolution of the convective weather, as the crystal typically developed at slightly different conditions then in which it is observed by the radar, due to the motion within the storm and the storm evolution.

Ice crystals also typically influence the atmospheric conditions in their vicinity. For example, it has been observed that ice crystals dropped in altitude and melted, thus creating a stratiform rain. The speed of the fall may also be greatly influenced by ice crystal size and mass. Weather radar systems capable of vertical or volumetric weather analysis (e.g. Honeywell IntuVue® RDR-4000 3D weather radar) may be able to capture this effect and infer (or predict) ice crystals presence from it.

In some example techniques described herein, a processor of a system predicts ice crystal presence by at least estimating the iced water content level of a volume of interest based on the spatial distribution of radar reflectivity values in the volume of airspace surrounding the volume of interest, and other information indicative of weather conditions in the volume of interest. The processor may also use the spatial distribution of radar reflectivity values in the volume of interest itself to predict the ice crystal presence. In some examples, the processor estimates the iced water content in the volume of interest using a model (also referred to herein as a "function') that relates radar reflectivity at a specific point in space to the iced water content in the atmosphere using other information indicative of weather in the volume of interest. In this way, the model may be a classifier between how the surrounding radar reflectivity values look and the iced water content level in the volume of interest. The model may be used to predict the iced water levels in a volume of interest based on the volume of airspace surrounding the volume of interest, which may indicate whether ice particles are present in the volume of interest (e.g., as the ice particles melt, they may show up in a volume of space at a lower altitude than the volume of interest).

In some examples, the model may be determined using linear or non-linear (e.g. quadratic) regression to find a best combination of factors and weights associated with the factors that best give a relatively precise estimation or approximation of ice particle density in an area. The estimation of the iced water content level may also be referred to herein as "iced water content level" or "determined iced water content level." The iced water content level of a volume of interest may be the density of ice particles in the volume of interest.

The model disclosed herein may be used by a processor to infer values of the non-measurable parameters that affect iced water content in a volume of space (i.e., mass-dimension relationship of an ice crystal and particle size distribution) based on radar reflectivity data for the space around the point for which the estimation is performed (e.g., local gradients of radar reflectivity values, spatially smoothed values of radar reflectivity values, vertical integrated radar reflectivity values, or any combination thereof), and one or more other types of information indicative of weather, such as one or more of: air temperature, altitude of the volume of interest for which the iced water content is being determined (e.g., estimated based on the altitude of the aircraft), location maxima of radar reflectivity, and freezing altitude. In this way, the processor may estimate the effect of the non-measurable parameters on the water in the volume of interest based on information indicative of weather and available to systems onboard the aircraft. The model may be used to analyze the convective weather shape, size, and position, and obtain some visibility to the mechanism of the ice crystal formation.

In contrast to models that assume constant mass-dimension relationship (m(d)) and size distribution of ice crystals (PSD(d)), the techniques described herein may provide a more accurate detection of hazardous weather conditions. Rather than simply disregarding the mass-dimension relationship (m(d)) and size distribution of ice crystals (PSD(d)), the models discussed herein relates parameters of one or more different types of weather information (e.g., air temperature, altitude, and freezing altitude) to the mass-dimension relationship (m(d)) and size distribution of ice crystals (PSD(d)), and, therefore, a processor predicting the presence of ice crystals using the model discussed herein indirectly takes the mass-dimension relationship (m(d)) and size distribution of ice crystals (PSD(d) into consideration. This may be an improvement over the models that assume constant mass-dimension relationship (m(d)) and size distribution of ice crystals (PSD(d)) and may result in a higher accuracy of high altitude ice crystal detection.

In some examples, the processor may estimate the iced water content level in a volume of interest using a more complex model, composed of two or more submodels, each of the submodels being more accurate for different iced water content levels. Thus, instead of applying one model to detect ice crystals, the processor may apply a plurality of submodels (e.g., two or more submodels) in order to determine whether a particular volume of air space has a relatively high level of iced water content. In some examples, a particular submodel may be more accurate for a limited iced water content level range. Thus, by applying a plurality of submodels, each of the submodels being more accurate for a respective iced water content level range, the processor may more accurately estimate the iced water content in a particular volume of space. The accuracy of the ice crystal presence prediction may increase with the number of submodels applied; however, the tradeoff may be processing power. Each of the submodels may also be more accurate for the different input variable ranges, i.e. locally approximating such specific variable. An example is a range of locally accurate estimators for various altitudes and/or temperature ranges.

In some examples, the processor determines a first iced water content level (e.g., measured as g/m$^3$) for a volume of interest based on a first submodel, determines a second iced water content level for the volume of interest based on a second submodel, and determines a third iced water content level for the volume of interest based on a third submodel. The processor may compare the first, second, and third determined iced water content levels to respective threshold values (e.g., associated with the first, second, and third models) in order to determine whether an iced content level is high enough to warrant taking an action. In some examples, the action is issuing a notification a user, e.g., a pilot an aircraft that is in or near the volume of interest, or a ground control station. In some examples, the processor issues a notification via a user interface of a device (e.g., onboard an aircraft) in response to determining the first iced water content level is greater than or equal to a first threshold value, the second iced water content level is greater than or equal to a second threshold value, or a third iced water content level is greater than or equal to a third threshold value. The first threshold may be greater than the second threshold, which may be greater than the third threshold. The notification may only be output for the largest threshold that the iced water content level exceeds. For instance, if the first threshold is satisfied, notifications may not be output for the second or the third thresholds, as the first threshold is larger than both the second threshold and the third threshold.

In other examples, the processor issues the notification in response to determining the third iced water content is greater than or equal to a third threshold value, in response to determining the third iced water content is less than the third threshold value and the second iced water content is greater than or equal to a second threshold value, or in response to determining the third iced water content is less than the third threshold value, the second iced water content is less than the second threshold value and the first iced water content is greater than or equal to a first threshold value. However, in response to determining the third iced water content is less than the third threshold value, the second iced water content is less than the second threshold value and the first iced water content is less than the first threshold value, the processor may determine that the predicted iced water content is not high enough to warrant issuing a notification and, therefore, may not issue a notification indicative of the detected iced water content level. The third threshold value may be less than the first and second threshold values, and the second threshold value may be less than the first threshold value.

In some examples, different notifications may be issued to indicate the relative level of detected iced water content. For example, in response to determining the third iced water content is greater than or equal to a third threshold value, the processor may issue a notification indicating a low iced water content was predicted. On the other hand, in response to determining the third iced water content is less than the third threshold value and the second iced water content is greater than or equal to a second threshold value, the processor may issue a notification indicating a medium iced water content was predicted. In response to determining the third iced water content is less than the third threshold value, the second iced water content is less than the second threshold value and the first iced water content is greater than or equal to a first threshold value, the processor may issue a notification indicating a relatively high iced water content was predicted.

The icing prediction models can be either obtained from theoretical research, or estimated based on existing ice-condition data.

In one example of this disclosure, models created by estimation methods using existing icing conditions flights data and known weather are described. During flights, an aircraft may have been equipped with a special probe measuring ice water content (IWC) around the aircraft, e.g. total water content probe, ice water content probe, isokinetic probe, ice crystal detector, or similar. Assuming negligible weather movement and evolution during short time periods (e.g., 3 minutes), measured in-situ IWC measurements (an example of the known weather) may be associated with the radar returns gained from its surrounding volume of airspace few minutes earlier from a distance of several tens of nautical miles. If IWC measurements and radar returns were gained by separate aircrafts, negligible weather movement and evolution assumption may be dropped.

Assuming there exist a mapping g mapping all features $\Theta_i$ observed by the aircraft weather system to the total water content, for every i-th measurement of IWC, the following relationship may be determined:

$$IWC_i = g(\Theta_i) \quad \text{(Equation 2)}$$

Features $\Theta_i$ include all available measurement data related to $IWC_i$. For example, $\Theta_i$ may include radar measurements, at, below, or around the $IWC_i$. Further, reflectivity and/or turbulence values may be used. Features $\Theta_i$ may also include additional information available to the aircraft weather radar system, for example but not limited to ambient air temperature or position, or lightning detector output.

Having collected $\Theta_i$ and corresponding $IWC_i$, regression may be used to generate the model, i.e. mapping g from the Equation 2. There exists a variety of methods for both linear and non-linear regression problem; any suitable regression technique may be used to generate the model. In one example, quadratic regression incorporating some previously known models (e.g. an atmospheric model predicting the air temperature at the place of ice-water content measurement observed by radar) may be used. In other examples, other methods for linear or non-linear regression may be used. For example least squares, total least squares, support vector regression, or other methods useful for regression may be utilized.

In some examples, a larger number of data $\Theta_i$ and corresponding $IWC_i$ may be used. In examples in which more complex regression techniques are used, more data may be required. The minimum required amount of data can be determined from the complexity of the regression technique used. Therefore, the output of the regression is a model g linking the information available to the aircraft with the weather system on board to the estimated IWC content in a remote place.

When more models are used, separate models might be estimated by restricting either or both $\Theta_i$ and corresponding $IWC_i$ to the conditions for which a particular model is targeted. In one example, when a model for dedicated IWC content is being built, $\Theta_i$, $IWC_i$ pairs may be restricted to those having the $IWC_i$ value around the dedicated IWC content. Similarly, in another example, different models might be built for different altitudes, having $\Theta_i$, $IWC_i$ pairs restricted to those where $\Theta_i$ contains corresponding altitude information. In some examples, a separate model may be built for any value or interval of features or measurements or to various combinations of those. Building separate models may require sufficient amount of data for each model. Therefore, the required amount of $\Theta_i$, $IWC_i$ pairs may be larger when more models are used.

In some examples, the models used by the processor to detect ice crystals may correspond to these different detection thresholds. For example, the first model may be used to generate a first iced water content level that is compared to a first threshold of 2.0 g/m³, the second model may be used to generate a second iced water content level that is compared to a second threshold of 1.0 g/m³, and the third model may be used to generate a third iced water content level that is compared to a third threshold of 0.5 g/m³. In this way, the models may be considered to be operational around different warning thresholds.

In other examples, the models used by the processor to detect ice crystals may be operational around a variable other than distance, e.g., different altitudes. The detection thresholds for detecting ice crystals of a sufficient density to warrant a notification or another action may vary based on the altitude of the volume of interest.

In some examples, the processor may display the determined iced water content levels on a display device, alone or in conjunction with other information, such as radar reflectivity values, a graphical indication of the flight path of an aircraft, one or more aircraft icons, and the like. By displaying the density approximations and issuing warnings if the local approximations are above predetermined threshold values, pilots may better be able to navigate aircrafts at higher altitudes, where ice crystals may be difficult to adequately detect based on radar alone.

While iced content level determinations using three models (and three respective threshold values) are primarily referred to herein, the systems described herein may detect ice crystals using any suitable number of models, such as one, two, three, or more.

Figure 1:
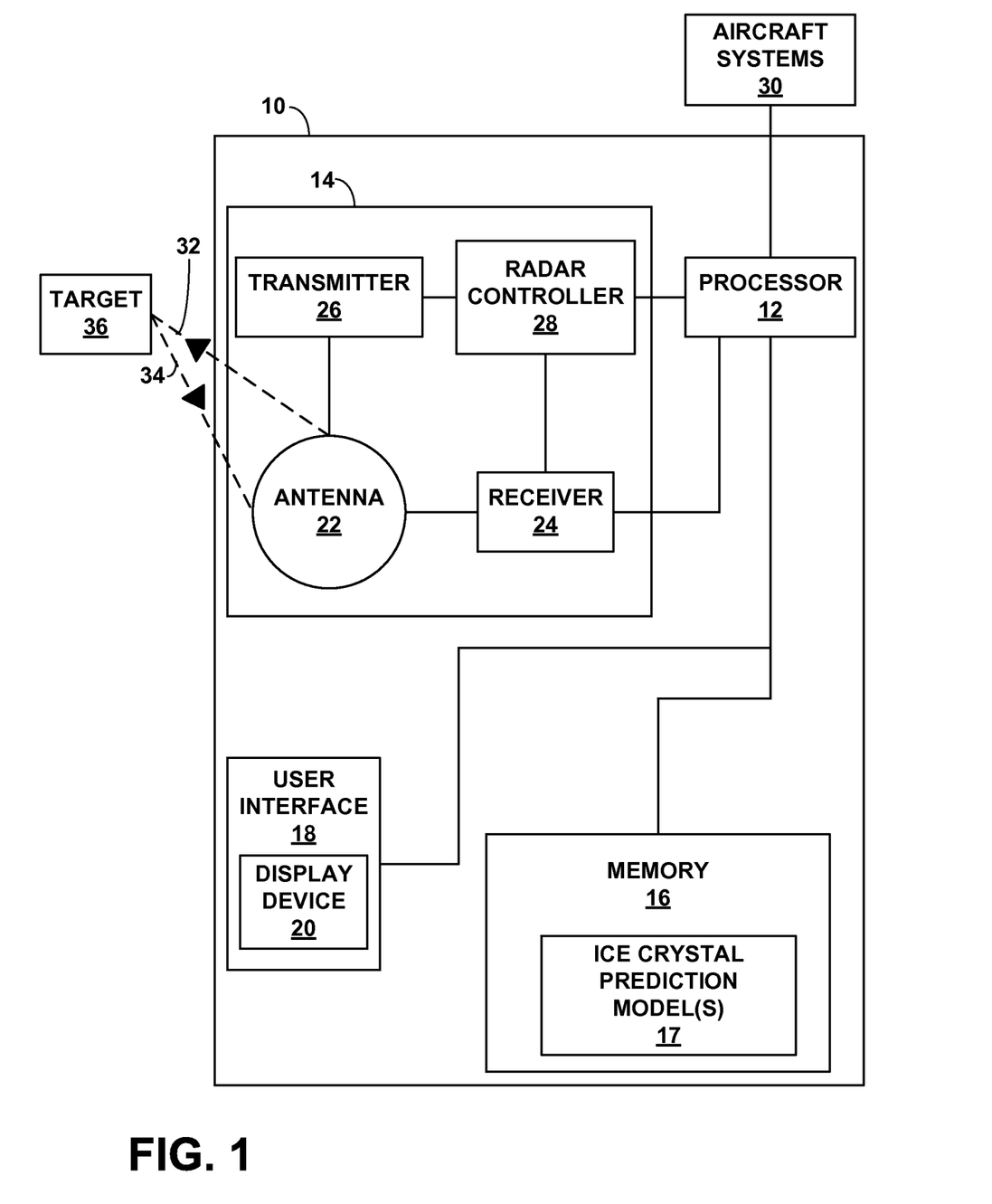
FIG. 1 is a block diagram illustrating details of an example weather radar system configured to predict high-altitude ice crystals presence, in accordance with one or more aspects of the present disclosure.

FIG. 1 is a block diagram illustrating details of an example system 10 configured to detect high-altitude ice crystals. System 10 may be onboard an aircraft (also referred to as an "ownship") in some examples, and may be external to the aircraft in other examples. System 10 includes processor 12, weather radar system 14, memory 16, and user interface 18, which includes display device 20. Processor 12 may be electrically coupled to radar system 14, user interface 18, and memory 16. Processor 12 may also be configured to communicate with other various aircraft systems 30, which may include, for example, a flight management system (FMS), an air data computer (ADC), a Inertial Navigation System (INS), a Global Positioning System (GPS), or any combination thereof.

Processor 12, as well as other processors disclosed herein (including radar controller 28 discussed below), can comprise any suitable arrangement of hardware, software, firmware, or any combination thereof, to perform the techniques attributed to processor 12 herein. For example, processor 12 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 16 includes any volatile or non-volatile media, such as a RAM, ROM, non-volatile RAM (NVRAM), electrically erasable programmable ROM (EEPROM), flash memory, and the like. Memory 16 may store computer readable instructions that, when executed by processor 12 cause processor 12 to implement the techniques attributed to processor 12 herein.

As discussed in further detail below, processor 12 is configured to predict a presence of ice crystals in a particular volume of interest based on radar reflectivity data from radar system 14 for the airspace around the volume of interest, and, in some examples, based on both radar reflectivity data and other information indicative of weather in a volume of interest. In addition, memory 16 stores one or more models 17 with which processor 12 may predict ice crystals presence in the volume of interest, where the models 17 relate the values of the weather information types to iced water content levels. Each of the models 17 may be, for example, an equation, a support vector machine, or another algorithm.

The information indicative of the weather, including the radar reflectivity data, may be received from other onboard sensors (a temperature sensor to detect the temperature of the air outside of and proximate aircraft 10), aircraft systems 30 (e.g., a flight management system may indicate the current altitude of aircraft 10, which may be used as the altitude of the volume of interest in some examples), weather information from a weather reporting service, based on weather information received from other aircraft, or any combination thereof. Although not specifically shown in FIG. 1, aircraft systems 30 may include a communication system configured to receive weather information from the weather reporting service, from other aircraft, or both.

Examples in which processor 12 detects ice crystals based on weather information from onboard weather sources, such as radar system 14 and onboard external temperature sensor, are primarily described herein. The techniques, however, may be applied to detect ice crystals based on weather information from another source, such as a weather reporting service, from other aircraft, or both.

In the example shown in FIG. 1, radar system 14 includes antenna 22, receiver 24, transmitter 26, and radar controller 28. Under the control of radar controller 28, transmitter 26 is configured to generate and transmit radar signals 32 from antenna 22 into airspace proximate the aircraft, and receiver 24 is configured to receive, via antenna 22, return signals from which reflectivity values can be estimated if target 36 is present to scatter energy back to the receiver. For example, receiver 24 may receive a Doppler frequency shift and signal power. Reflectivity can be estimated by taking into account range and attenuation from closer weather cells, as well as other factors. Target 36 can be, for example, a weather object, and the reflectivity data may corresponds to that portion of the signal reflected back to the radar by liquids (e.g., rain) and/or frozen droplets (e.g., hail, sleet, and/or snow) residing in a weather object, such as a cloud or storm, or residing in areas proximate to the cloud or storm generating the liquids and/or frozen droplets.

In some examples, radar system 14 may measure radar reflectivity in a volume of the aircraft by sweeping the antenna around two axes. By complex signal processing and motion compensation, radar controller 28 of radar system 14 generates a three-dimensional (3D) array of reflectivity information. In some examples, radar controller 28 controls transmitter 26 and receiver 24 to send and receive signals 32, 34, respectively, via the antenna 22 based on aircraft data (e.g., position, heading, roll, yaw, pitch, and the like) received from aircraft systems 30.

In some examples, radar controller 28 digitizes the return signals 34 and sends the digitized signals to processor 12. Processor 12 may receive the radar returns data from radar system 14 and store the radar return data in memory 16. In some examples, processor 12 may translate the received return signals for storage in a 3D buffer in memory 16. For example, radar system 14 may be configured scan the entire 3D space in front of the aircraft, and processor 12 may store all reflectivity data in a 3D (or "volumetric") memory buffer. The 3D buffer may be earth referenced, aircraft referenced, or arbitrarily referenced. Processor 12 can update the buffer with radar reflectivity data from new scans. In some examples, processor 12 updates the data in the buffer every 30 seconds, although other update frequencies can also be used. In other examples, the processor can update the buffer continuously, immediately feeding in updated radar measurements. Processor 12 can then extract reflectivity data from the buffer to generate the desired weather information without having to make and wait for view-specific antenna scans.

Example 3D volumetric buffers, example radar systems, or both, are described in U.S. Pat. No. 4,940,987 to Frederick, U.S. Pat. No. 5,202,690 to Frederick, U.S. Pat. No. 5,781,146 to Frederick, U.S. Pat. No. 5,828,332 to Frederick, U.S. Pat. No. 5,920,276 to Frederick, U.S. Pat. No. 6,597,305 to Szeto et al., U.S. Pat. No. 6,667,710 to Cornell et al., U.S. Pat. No. 6,690,317 to Szeto et al., U.S. Pat. No. 6,707,415 to Christianson, U.S. Pat. No. 6,720,906 to Szeto et al., U.S. Pat. No. 6,839,018 to Szeto et al., U.S. Pat. No. 8,068,050 to Christianson, U.S. Pat. No. 8,111,186 to Bunch et al., and U.S. Pat. No. 8,289,202 to Christianson, the entire contents of which are incorporated herein by reference.

In some examples, radar system 14 may be an X-band radar, e.g., operating in a frequency range of 8 gigahertz (GHz) to about 12 GHz, such as about 9.4 gigahertz GHz, which may be adapted to reliably detect the content of liquid water. Assuming the available input information is Z-radar information ($mm^6/m^3$), to determine iced water content, processor 12 (or another processor of another system) may use a function f that relates the reflectivity at a specific point in the air and the iced water content level (IWC). An example of such a function is provided above as Equation 1.

In some examples, processor 12 is part of a weather detection system and is configured to determine weather proximate aircraft 12 based on the radar reflectivity data (also referred to herein as radar return data) provided by radar system 14. For example, processor 12 may identify the type of detected weather objects (also referred to herein as "weather cells" in some examples) proximate the aircraft, such as rain/moisture, wind shear, or turbulence based on the radar reflectivity data and a corresponding algorithmic interpretation of the reflectivity values. An example technique that processor 12 may implement to discriminate between different types of weather using a Vertically Integrated Reflectivity (VIR) calculation is described in U.S. Pat. No. 8,068,050 to Christianson et al., which issued on Nov. 29, 2011 and is entitled, "METHODS AND SYSTEMS FOR DETECTION OF HAZARD TO AVIATION DUE TO CONVECTIVE WEATHER," the entire content of which is hereby incorporated by reference. VIR data includes the sum of reflectivity values stored in a column of cells in the three-dimensional buffer or an integration of the values in the column of cells is performed. Processor 12 may vertically integrate the product of reflectivity values and altitude, each raised to some power.

User interface 18 is configured to present weather information (e.g., iced water content determinations for one or more operating points, notifications regarding detected iced water content, and the like) to a user, who may be a pilot of the aircraft, another flight crew member, or may be located remotely from the aircraft, such as at a ground control station. User interface 18 includes display device 20, which can be, for example, one or more of a liquid crystal display (LCD) or a light emitting diode (LED) display configured to present visual information to the user. Display device 20 can be provided by any suitable device, such as, for example, one or more of a tablet computing device, an electronic flight bag (EFB), a primary flight display (PFD), a multifunction display (MFD), a navigation display, or any other suitable display. Display device 20 can be a head-up display, a head-down display, or a head-mounted display.

In addition, in some examples, user interface 18 includes a speaker configured to deliver audible notifications, a sensory device configured to deliver notifications via a somatosensory alert, or any combination thereof. User interface 18 is configured to receive input from a user. For example, user interface 18 can include one or more of a keypad, buttons, a peripheral pointing device or another input mechanism that allows the user to provide input. The buttons may be dedicated to performing a certain function, e.g., receiving user input indicative of a specific type of input, or the buttons and the keypad may be soft keys that change in function depending upon the section of a display currently viewed by the user. In some examples, the display device of user interface 18 may be a touch screen display configured to receive the input from a user.

As discussed below with reference to FIGS. 2-4, in accordance with techniques of the current disclosure, processor 12 is configured to receive information indicative of weather in a volume of interest and a surrounding volume. The information includes a three-dimensional array of radar reflectivity values, corresponding to the radar reflectivity values for the volume of interest and the surrounding volume. The processor may then determine a predicted iced water content based on the received information from radar system 14 and other information indicative of weather in a volume of interest from one or more other sources. In some examples, processor 12 may apply one or more models (also referred to herein as "estimators") to generate multiple iced water content level estimations (e.g., two, three or more). Processor 12 may then compare the one or more iced water content level estimations (determined based on respective models) to respective threshold values, issuing warnings based on the comparisons, e.g., as discussed with respect to FIG. 4.

Any combination of the features of the system discussed above may be used with the high-altitude ice crystal presence prediction techniques disclosed herein. System 10 is only one example of a system configured to predict high-altitude ice crystal presence. Other systems including a different configuration of components can also be used for the techniques disclosed herein.

Figure 2:
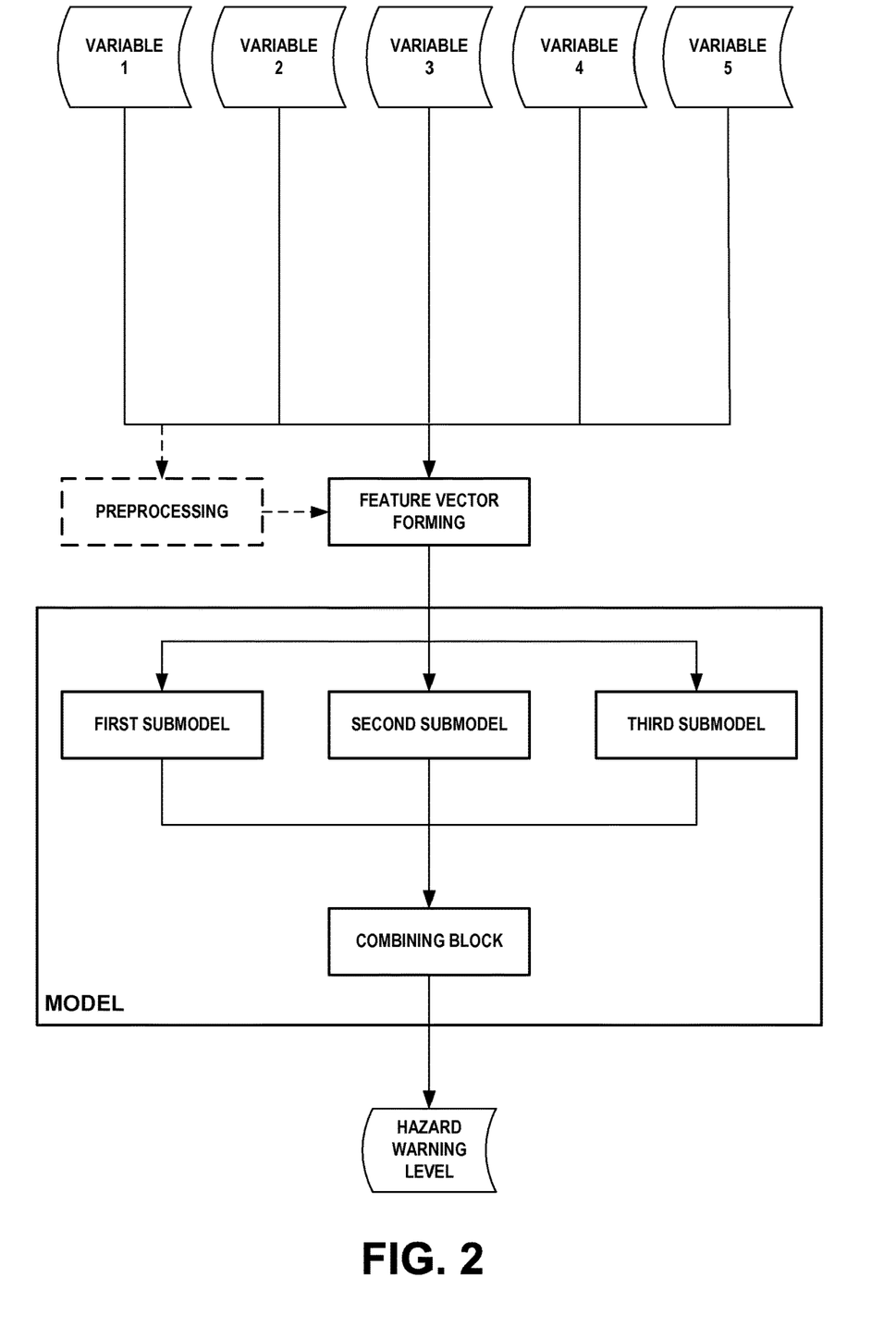
FIG. 2 is a flow diagram illustrating an example technique for predicting ice crystals presence, in accordance with one or more aspects of the current disclosure.

FIG. 2 is a block diagram illustrating an example technique for detecting ice crystals. While FIG. 2, as well as the other techniques described herein, are primarily described as being performed by processor 12, in other examples, one or more other processors, alone or in combination with processor 12, may perform any parts (or the entirety) of the techniques described herein. The other processors may be onboard aircraft 10 or may be a part of another system, such as a ground system or another airborne system.

As discussed above, in some examples, processor 12 may estimate the effect of non-observed parameters, e.g., m(d) (mass-dimension relationship) and PSD(d) (particle-size distribution of ice crystals), of ice crystal formation based on one or more types of weather information readily available to processor 12 onboard aircraft 10, including radar reflectivity values (values both at point of interest and in surrounding space) and one or both of: ambient air temperature and aircraft altitude. In some examples, the weather information available to the processor 12 may include uploaded meteorological information gained from a database (e.g. as recorded by other meteorological instruments or aircraft flying through the area shortly before.). This uploaded meteorological information may include freezing altitude or other information. These weather information types may provide some visibility to the mechanism of the ice crystal formation in the volume of interest.

As shown in FIG. 2, processor 12 may receive information indicative of weather in a volume of interest (shown as "variables"). The variables can each be any suitable type of information, such as, for example, one or more of: aircraft altitude, the vertical reflectivity profile from radar system 14, that includes the one or more radar reflectivity values in the surrounding volume and, in some examples, in the volume of interest, the ambient air temperature around the aircraft, or uploaded meteorological information originating from the outside source. The vertical reflectivity profile can include, for example, the radar reflectivity values within the one or more columns of a 3D memory buffer that correspond to the location of the volume of interest. The radar reflectivity values for a column of the 3D memory buffer indicate the radar reflectivity values for a range of altitudes at a common longitude and latitude position. Processor 12 may receive the information regarding the aircraft altitude from aircraft systems 30 (FIG. 1), receive the radar reflectivity information from radar system 14 (FIG. 1), and receive the ambient air temperature from a temperature sensor onboard aircraft 10 or from external system.

In other examples, different weather information types or combinations of weather information types may be used to estimate the iced water content level for a volume of interest. For example, turbulence information, as provided by the weather radar, can be used. While FIG. 2 only five variables (e.g., each corresponding to a respective type of weather information), in other examples, processor 12 may use any suitable number of variables, and in any suitable combination of weather information types, to estimate the iced water content levels for a volume of interest.

In some examples, processor 12 may extract other information from the received information via preprocessing as shown in FIG. 2. For example, preprocessing performed by the processor 12 as shown in FIG. 2 may include on or more of the following: vertical integrated reflectivity calculation from the vertical reflectivity profile, transformation of reflectivity using a power law equation, computation of the freezing altitude, calculation of distance between volume of interest and deep convective core, and predicting the temperature at the volume of interest. The preprocessing block, as shown in FIG. 2, can greatly increase performance of the model, allowing simpler models to be used.

Vertical reflectivity may be calculated, for example, by methods such as those described in U.S. Pat. No. 8,068,050 to Christianson et al., which issued on Nov. 29, 2011 and is entitled. "METHODS AND SYSTEMS FOR DETECTION OF HAZARD TO AVIATION DUE TO CONVECTIVE WEATHER." Techniques of U.S. Pat. No. 8,068,050 to Christianson et al. that may be incorporated with techniques described herein include distinguishing deep convective storms based on vertical integrated reflectivity. In some examples, processor 12 may further be configured to calculate the distance between a volume of interest and a deep convective core by first detecting cores of deep convective storms. In other examples, processor 12 may obtain the information from other sources, such as a weather reporting system, other aircrafts, or any other source capable of transmitting weather information. Processor 12 may further calculate a distance between the convective core and the volume of interest. In some examples, processor 12 may calculate the distance to the closest deep convective core. In other examples, processor 12 may calculate the distance to the closest convective core in an upwind direction from the volume of interest. In still other examples, processor 12 may calculate the distance to any other deep convective core. Processor 12 may determine the upwind direction from aircraft sensors, such as a positioning system, an aircraft heading, or an engines thrust level. In other examples, processor 12 may determine the upwind direction from external sources such as a weather reporting system. In some examples, processor 12 may determine a horizontal distance to the deep convective core. In other examples, processor 12 may determine a distance to the center of the core, to cells with the highest reflectivity in the core, or to some other location within the deep convective core.

Processor 12 may perform a transformation of reflectivity using the power law equation, which uses ice-reflectivity models to provide an initial estimate of the ice water content in the area of interest. The IWC power law model may provide valuable input to more sophisticated models, estimating the IWC from additional available information. An example of such a model can be found at Heymsfield, A. J., et al, "Improved Ice Water Content Retrieval Algorithms Using Coincident Microphysical and Radar Measurements", Journal of Applied Meteorology, September 2005. The equation derived from this publication relating IWC to reflectivity (Z) is:

$$IWC = 0.179 Z^{0.29} \qquad \text{(Equation 3)}$$

Processor 12 can determine both freezing altitude and predicted temperature at the location (altitude) of the point of interest from the aircraft altitude, measured ambient air temperature, and altitude of the area of interest using an atmospheric model. For example, International Standard Atmosphere model or International Civil Aviation Organization (ICAO) Standard Atmosphere model can be used, although techniques described herein are not limited to only these models.

In the technique shown in FIG. 2, processor 12 generates a feature vector that includes received values for the weather information types and uses the feature vector as an input to a model that relates the values of the weather information types to iced water content levels. In some examples of this disclosure, a model may consist of multiple submodels as illustrated in FIG. 2. In other examples, a single model might be used. In some examples, the model or submodel may be a quadratic model comprising weighted values combined with each of the one or more information types. In determining the quadratic model, processor 12 or another processor may perform a regression analysis to find the appropriate parameters (e.g., weather information types) of a mathematical model that best transforms available preprocessed inputs to measured ground truth iced water content. In some examples, a linear model may be sufficient. In some examples, however, a quadratic model may provide a more sufficient correlation between estimates and ground truth. The ground truth may be a reference value of known total water content at a particular point (or volume of space), where it is assumed, due to sufficiently low temperature, that all water is frozen, so that the total water content is equal to the iced water content. In some examples, the ground truth may be determined using a hot-wire probe, in other examples, isokinetic probe or multi-beam-multi-polarization cloud radar may be used.

In the examples in which a quadratic model is used, the iced water content level (IWC) may be determined using the following equation (model):

$$IWC = w_0 + w_1 f_1 + w_2 f_2 + \ldots + w_1 f_1^2 + w_2 f_2^2 + \ldots + w_{12} f_1 f_2 + w_{13} f_1 f_3 + \ldots \quad \text{(Equation 4)}$$

In Equation 4, the variable w indicates a value used to weight the particular input type f from the feature vector. In some examples, additional increase of polynomial order or other functions may more accurately model the behavior of iced water and, therefore, improve the estimation of iced water content. Depending on the types of weather information used as inputs, however, a quadratic model may be a reasonable compromise between model complexity and the accuracy of the iced water content estimates.

The model, possibly consisting of multiple submodels, used by processor 12 to estimate iced water content in a particular volume of interest may be stored by memory 16 of aircraft 10 (e.g., as model(s) 17 shown in FIG. 1) or a memory of another system that may be onboard aircraft 10 or external to aircraft 10. The model may be determined using any suitable technique. For example, a plurality of input weather information types may be selected using empirical insight into the effects of the weather parameters indicated by the weather information types on the development of ice crystals, e.g., based on the literature analysis. The plurality of input weather information types can include, for example, a freezing altitude, altitude, temperature, and radar reflectivity values or values derived from the radar reflectivity values. The relationship between the values of these information types and iced water content levels may be determined using known values, i.e., known iced water content levels (also referred to herein as "ground truth iced water content levels") and values of the input weather information types.

As the inputs may not be statistically independent and least squares may be used to find the appropriate model parameters, dimensionality reduction may be performed in some examples. For example, Principal Component Analysis may be performed; Principal Component Analysis is a statistical procedure that uses an orthogonal transformation to convert a set of observations of possibly correlated variables into a set of values of linearly uncorrelated variables. In some examples, a two-level optimization may be utilized to find the best combination of input information types and their associated weighting variables, where the outer optimization selects the appropriate subset of input information types by exhaustive or guided search, and the inner optimization performs the least squares method to find the best combination of input information types and their associated weighting variables.

In some examples, the model is generated off-line, using all the available data with ground truth iced water content levels such that processor 12 of aircraft 10 need not determine the one or more models. In other examples, processor 12 may dynamically determine the one or more models based on the available types of weather information or may update the one or more models with additional data points over time. For example, processor 12 may preprocess the inputs in the same way as discussed above, and then execute the determined model, simply as a calculation of a single equation. In either example, the determined models may be stored by memory 16 of aircraft or another memory. In other examples, the model can be programmed into the processor 12, based on e.g. scientific publications, wind tunnels experiments, theoretical physics calculations, etc.

As discussed above, in some examples, multiple submodels may better indicate the iced water content levels in a volume of interest, e.g., depending on the actual level of iced water content in the volume of interest, altitude of the volume of interest or other quantity. Therefore, in some examples, processor 12 may apply at least two separate submodels to determine the iced water content levels. In the example shown in FIG. 2, processor 12 applies three different submodels, each being operational around different warning thresholds. The models may differ from each other, e.g., based on the weighting variables, the weather information types used in the model, the type of function, or any combination thereof.

When each submodel operates on a different level of input quantity (e.g. altitude), the appropriate submodel is used depending on input data. On the other hand, when submodels are designed for different levels of output quantity (e.g., iced water content), each submodel can be built separately, because the submodel is typically built using available data where the output quantity has been already measured. However, when submodels are evaluated on unknown data to estimate the output (e.g., iced water content), all submodels may be evaluated and based on their outcome. In such examples, a combining rule may be defined. In one example the submodels may be built such that, although providing insufficiently accurate results about different IWC levels, the predicted IWC value is still close to its real value, thus a submodel designed to represent this range of IWC measurements is selected to provide the output of the entire model.

As shown in FIG. 2, processor 12 inputs the feature vector to a first submodel, a second submodel, and a third submodel. Processor 12 compares the outputs of the models to respective threshold values, which is represented by the combining block in FIG. 2. The outputs of the models may be the iced water content levels determined by processor 12 using the respective model. Thus, the first model may output a first iced water content level, the second model may output a second iced water content level, and the third model may output a third iced water content level. In some examples, processor 12 may determine a hazard warning level based on the comparison of the first, second, and third iced water content levels to first, second, and third threshold values, respectively, and generate a notification based on the determined hazard level. In some examples, the first threshold value is 2 g/m$^3$, the second threshold value is 1.0 g/m$^3$, and the third threshold value is 0.5 g/m$^3$. Other threshold values may be used in other examples.

In some examples, processor 12 is configured to generate and present (e.g., via display device, shown in FIG. 1) a graphical user interface that illustrates iced water content levels determined by processor 12, e.g., using the technique described with respect to FIG. 2. The graphical user interface may enable a pilot or another user to visualize the detected ice crystal distribution, e.g., as it relates to the predicted flight path of aircraft 10. FIG. 3 illustrates an example graphical user interface 60 generated by processor 12. Graphical user interface (GUI) 60 illustrates a slice of the radar buffer (generated by processor 12 based on information from radar system 14) at the pre-determined altitude. The altitude may be pre-determined either manually or automatically by the processor 12. Thus, GUI 60 illustrates airspace ahead of the aircraft 10. The dimensions shown along the x- and y-axes represent distance values (NM).

GUI 60 may also include graphical representations of at least one determined iced water content level. Alternatively, multiple iced water content levels may be depicted. For example, two levels (at 66A) or three levels (at 66B) are depicted on FIG. 3. Attributes of the graphical representations of determined iced water content levels 66A and 66B may provide the notifications to the user discussed above, e.g., the color or pattern of the graphical representations may indicate the hazard level of the determined iced water content level for the airspace associated with the graphical representations.

Figure 3:
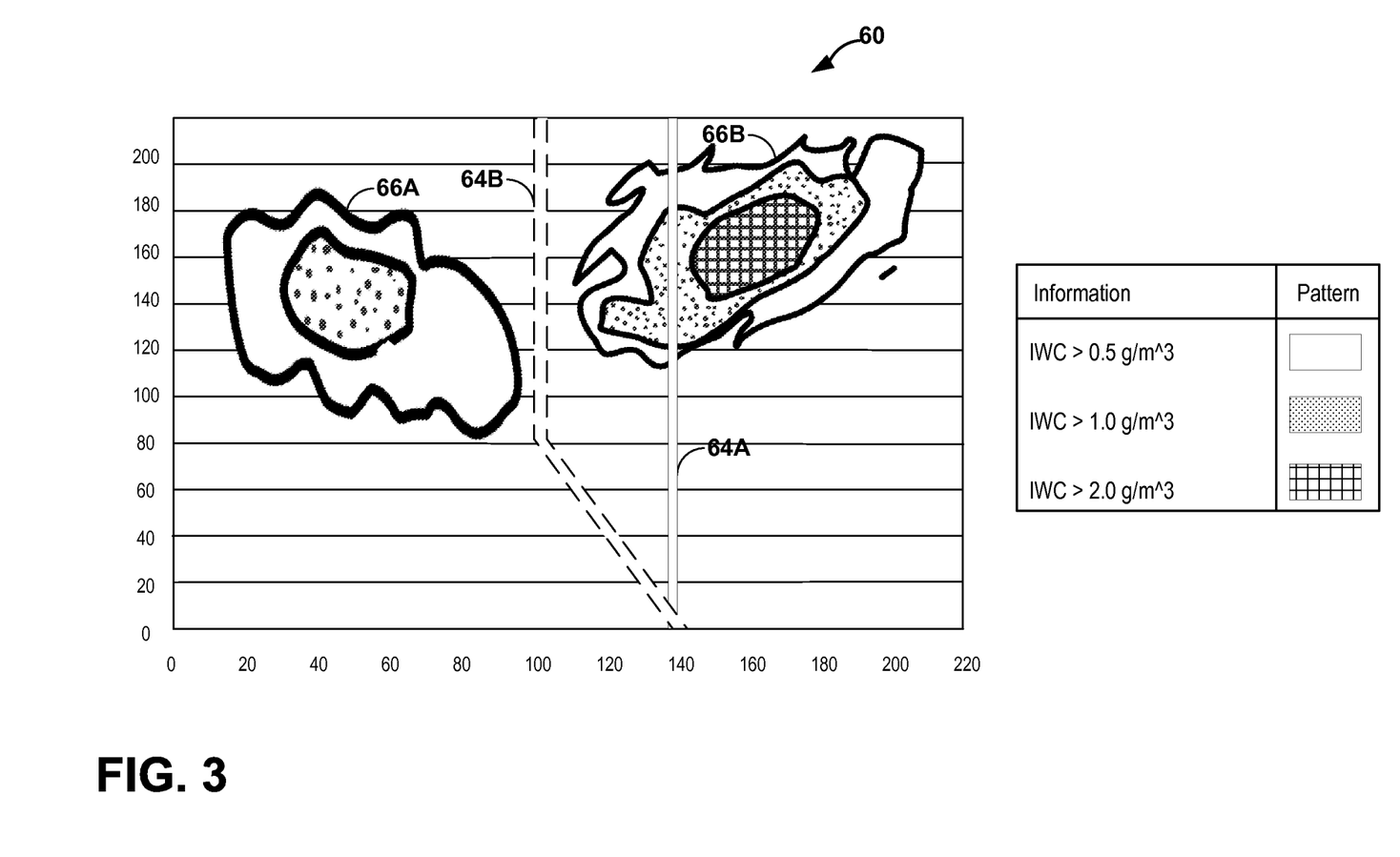
FIG. 3 is an example display illustrating an example graphical user interface illustrating estimated iced water content levels, in accordance with one or more aspects of the current disclosure.

The determined iced water content levels 66A and 66B are shown as ranges of iced water content levels in FIG. 3. For example, the cross-hatched pattern represents a volume of space with an iced water content level greater than or equal to 2.0 g/m$^3$, the dotted pattern represents a volume of space with an iced water content level greater than or equal to 1.0 g/m$^3$, but less than 2.0 g/m$^3$, and the solid-white pattern represents a volume of space with an iced water content level greater than or equal to 0.5 g/m$^3$, but less than 1.0 g/m$^3$. In other examples, the determined iced water content levels may be shown in more granular ranges or as exact levels.

The iced water content level ranges are displayed as respective patterns in GUI 60. In addition to, or instead of, the patterns, different colors or other graphical indicia (e.g., line weights, shading, icons, numbers, or the like) may be used to indicate the determined iced water content levels 66A and 66B. For example, a red color may be used to denote the airspace having an iced water content level greater than or equal to 2.0 g/m$^3$, a yellow color may be used to denote the airspace having an iced water content level greater than or equal to 1.0 g/m$^3$, but less than 2.0 g/m$^3$, and a green color may be used to represent the airspace having an iced water content level greater than or equal to 0.5 g/m$^3$, but less than 1.0 g/m$^3$.

As shown in FIG. 3, in some examples, processor 12 may generate GUI 60 including a graphical representation of an expected flight path 64A of aircraft 10. Processor 12 may determine expected flight path 64 using, for example, a stored flight plan (stored by memory 16, another memory device, or in aircraft system 30, such as in a flight management system (FMS)). By including the graphical representation of an expected flight path 64A, GUI 60 may present information that enables a user to quickly ascertain whether the expected flight path of aircraft 10 will cause aircraft 10 to fly into volumes of airspace having undesirable level of ice crystals. Thus, based on GUI 60, a pilot of aircraft 10 may choose to modify the flight path of aircraft 10 to avoid certain volumes of airspace that may have a relatively high density of ice crystals.

Processor 12 may also recommend a different flight path that may be used to avoid volumes of airspace predicted to have ice crystals, and generate GUI 60 including a visual representation of the recommended flight path 64B. In the example of FIG. 3, expected flight path 64A is projected to fly through a volume of airspace where there are predicted iced water levels exceeding those recommended for flight. Therefore, processor 12 may determine a recommended flight path 64B. As shown in FIG. 3, recommended flight path 64B may be visually distinct from expected flight path 64A. Recommended flight path 64B also avoids the predicted volumes of airspace that have predicted iced water levels that may be harmful to fly through or volumes of airspace containing any other potentially harmful weather, such as a convective storm, severe rain, turbulences, lightning, or hail. Processor 12 may also provide information about iced water levels to aircraft systems 30, which may be configured to determine recommended flight path 64B in a flight management system (FMS).

Figure 4:
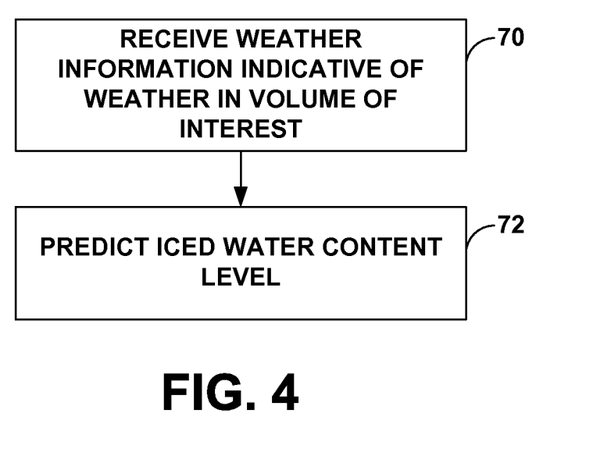
FIG. 4 is a flow diagram illustrating an example technique for detecting ice crystals, in accordance with one or more aspects of the current disclosure.

FIG. 4 is a flow diagram illustrating an example technique for predicting ice crystals presence, in accordance with one or more aspects of the current disclosure. Techniques of the current disclosure include a method for predicting ice crystals presence. According to these techniques, processor 12 of aircraft 10 (or another processor) receives information indicative of weather in a volume of interest and a volume of airspace surrounding the volume of interest (70). In some examples, the information may include a three-dimensional array of radar reflectivity values for the volume of interest and/or the volume of airspace surrounding the volume of interest. In some further examples, the information indicative of weather conditions may further include one or more of an aircraft altitude, an altitude of the volume of interest, and an ambient air temperature around the aircraft.

In some examples, the model may include a polynomial model of one or more information types and one or more weights associated with the respective information type. In such examples, the one or more information types are each indicative of the weather in the volume of interest. In some examples, techniques of this disclosure include generating the model. In some such examples, processor 12 may generate the model by preprocessing one or more of a freezing altitude calculation, a predicted temperature at the volume of interest, a vertically integrated reflectivity calculation, or an iced-water-content-reflectivity power law value. In other examples, processor 12 may generate the model by applying a nonlinear regression technique to previously measured information indicative of the weather and corresponding previously measured iced water content. In other examples, processor 12 may receive a model generated previously by processor 12 or any other processor, including processors that are not connected to aircraft 10. The model may be stored in memory 16 or any other memory.

In some examples, the model may include a plurality of submodels. In some such examples, the plurality of submodels is based on either an input quantity or an output quantity. Each of the submodels may be more accurate for different iced water content levels. Thus, instead of applying one model to detect ice crystals, the processor may apply a plurality of submodels (e.g., two or more submodels) in order to determine whether a particular volume of air space has a relatively high level of iced water content. In some examples, a particular submodel may be more accurate for a limited iced water content level range. Thus, by applying a plurality of submodels, each of the submodels being more accurate for a respective iced water content level range, the processor may more accurately estimate the iced water content in a particular volume of space. The accuracy of the ice crystal presence prediction may increase with the number of submodels applied; however, the tradeoff may be processing power. Each of the submodels may also be more accurate for the different input variable ranges, i.e. locally approximating such specific variable. An example is a range of locally accurate estimators for various altitudes and/or temperature ranges.

Processor 12 determines a predicted iced water content based at least in part on a model and the received information (72). In some examples, techniques of this disclosure may further include processor 12 outputting, for display at a display device, a graphical indication indicative of the predicted iced water content being above a specified level or of one or more ranges of predicted iced water content values, e.g., as described with respect to FIG. 3. In some examples, determining the predicted iced water content comprises determining a presence of iced water content.

In one or more examples, the functions described herein, e.g., as being performed by processor 12 or another component, may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A method comprising:
   receiving, by a processor, information indicative of weather in a volume of airspace surrounding a volume of interest, wherein the information comprises radar reflectivity values;
   determining, by the processor and based at least in part on a model and the received information, a predicted iced water content level for the volume of interest, wherein the model is generated based on an application of a nonlinear regression technique to previously measured information indicative of known weather and corresponding previously measured iced water content, wherein determining the predicted iced water content level comprises utilizing, by the processor, the model to determine the predicted iced water content level by at least preprocessing one or more of: a freezing altitude calculation, a predicted temperature at the volume of interest, a vertically integrated reflectivity calculation, or an iced-water-content-reflectivity power law value; and
   outputting, by the processor for display at a display device, a graphical indication indicative of the predicted ice water content for the volume of interest.

2. The method of claim 1, wherein the graphical indication is indicative of the predicted iced water content being above a specified level or of one or more ranges of predicted iced water content values.

3. The method of claim 1, wherein the information indicative of weather further comprises one or more of: an aircraft altitude, an altitude of the volume of interest, or an ambient air temperature around the aircraft.

4. The method of claim 1, wherein the model comprises a polynomial model of one or more information types and one or more weights associated with the respective information type, wherein the one or more information types are each indicative of the weather in the volume of airspace surrounding the volume of interest.

5. The method of claim 1, wherein the model comprises a plurality of submodels, wherein the plurality of submodels are based on one of an input quantity or an output quantity.

6. The method of claim 1, further comprising:
   receiving, by the processor, information indicative of weather in the volume of interest, wherein the information comprises radar reflectivity values; and
   determining, by the processor and based at least in part on the model, the information indicative of weather in the volume of interest, and the information indicative of weather in the volume of airspace surrounding the volume of interest, the predicted iced water content level for the volume of interest.

7. The method of claim 1, further comprising:
   generating, by the processor, the model by at least applying the nonlinear regression technique to the previously measured information indicative of known weather and the corresponding previously measured iced water content.

8. The method of claim 1, further comprising:
   retrieving, by the processor, the model from a memory configured to store the model.

9. A method comprising:
   receiving, by a processor, information indicative of weather in a volume of airspace surrounding a volume of interest, wherein the information comprises radar reflectivity values, and wherein the information indicative of weather further comprises one or more of: an aircraft altitude, an altitude of the volume of interest, or an ambient air temperature around the aircraft;

determining, by the processor and based at least in part on a model and the received information, a predicted iced water content level for the volume of interest, wherein the model is generated based on an application of a nonlinear regression technique to previously measured information indicative of known weather and corresponding previously measured iced water content; and outputting, by the processor for display at a display device, a graphical indication indicative of the predicted ice water content for the volume of interest.

10. A system comprising:

a memory configured to store a model and information indicative of weather in a volume of airspace surrounding a volume of interest, wherein the information comprises radar reflectivity values, wherein the model is generated based on an application of a nonlinear regression technique to previously measured information indicative of known weather and corresponding previously measured iced water content;

a processor configured to determine, based at least in part on the model and the information, a predicted iced water content for the volume of interest by at least utilizing the model to determine the predicted iced water content level by at least preprocessing one or more of: a freezing altitude calculation, a predicted temperature at the volume of interest, a vertically integrated reflectivity calculation, or an iced-water-content-reflectivity power law value; and a display device, wherein the processor is further configured to output, for display at the display device, a graphical indication indicative of the predicted ice water content for the volume of interest.

11. The system of claim 10, wherein the memory is further configured to store information indicative of weather in the volume of interest, wherein the information comprises radar reflectivity values; and wherein the processor is further configured to determine, based at least in part on the model, the information indicative of weather in the volume of interest, and the information indicative of weather in the volume of airspace surrounding the volume of interest, the predicted iced water content level for the volume of interest.

12. The system of claim 10, wherein the processor is further configured to:

detect a core of a deep convective storm; and determine a distance between the volume of interest and the core.

13. The system of claim 10, wherein the graphical indication is output indicative of the predicted iced water content being above a specified level or of one or more ranges of predicted iced water content values.

14. The system of claim 10, wherein the information indicative of weather further comprises one or more of: an aircraft altitude, an altitude of the volume of interest, or an ambient air temperature around the aircraft.

15. The system of claim 10, wherein the model comprises a polynomial model of one or more information types and one or more weights associated with the respective information type, wherein the one or more information types are each indicative of the weather in the volume of airspace surrounding the volume of interest.

16. The system of claim 10, wherein the model comprises a plurality of submodels, and wherein the plurality of submodels are based on one of an input quantity or an output quantity.

\* \* \* \* \*